United States Patent [19]

Lucas

[11] Patent Number: 5,376,292
[45] Date of Patent: Dec. 27, 1994

[54] DEICING COMPOSITIONS CONTAINING FERROCYANIDE ANTICAKING AGENTS

[75] Inventor: Nancy L. Lucas, Eagan, Minn.

[73] Assignee: Cargill Incorporated, Minneapolis, Minn.

[21] Appl. No.: 64,697

[22] Filed: May 19, 1993

[51] Int. Cl.$^5$ ............................................. C09K 5/00
[52] U.S. Cl. .................................. 252/70; 106/13
[58] Field of Search ............................ 252/70; 106/13

[56] References Cited

U.S. PATENT DOCUMENTS

| 3,378,493 | 4/1968 | Jacoby et al. | 252/70 |
| 3,396,113 | 8/1968 | Jacoby et al. | 252/70 |
| 3,490,744 | 1/1970 | Binsley | 252/70 |

OTHER PUBLICATIONS

CA110 (16):140451s Abstract of JP 63,225,686 to Okada et al. (Sep. 20, 1988).
CA101 (12):93643d Abstract of "Effect of Different Factors on the Caking Tendency of Industrial-Grade Salt," Yurkina et al. (1984) *no month available.
CA71 (25):122607q Abstract of GB 1,163,888 to Crow (Sep. 10, 1969).
CA70 (20):89166z Abstract of "Caking of Salt," Cent. Salt and Mar. Chem. Res. Inst. (1968) no month available.
CA66(8):30574v "Sodium Ferrocyanide as an Anticaking Agent for Sodium Chloride," Intern. Salt Co. (Abstract unavailable). (1966) no month available.
C.A. vol. 20 "The Decomposition of Potassium Ferrocyanide in the Light," Rossi and Bocchi, p. 1357 (1926) no month available.
WPI Abstract of DE 1,467,247, (Jul. 17, 1969).
WPI Abstract of U.S. Pat. No. 3,558,512 (Jan. 26, 1971).
WPI Abstract of U.S. Pat. No. 3,527,560, (Sep. 8, 1970).
WPI Abstract of U.S. Pat. No. 3,505,234, (Apr. 7, 1970).
WPI Abstract of U.s. Pat. No. 3,490,744, (Jan. 20, 1970).
WPI Abstract of U.s. Pat. No. 3,428,571, (Feb. 18, 1969).
WPI Abstract of U.S. Pat. No. 3,396,113, (Aug. 6, 1968).
WPI Abstract of U.S. Pat. No. 3,383,317, (May 14, 1968).
WPI Abstract of U.S. Pat. No. 3,382,175, (May 7, 1968).
WPI Abstract of U.S. Pat. 3,378,493, (Apr. 16, 1968).
WPI Abstract of U.S. Pat. No. 3,174,825, (Mar. 23, 1965).
WPI Abstract of U.S. Pat. No. 3,009,775, (Nov. 21, 1961).
WPI Abstract of U.S. Pat. No. 2,947,603, (Aug. 2, 1960).
WPI Abstract of U.S. Pat. No. 3,036,884, (May 29, 1962).
Abstract of "Observed Characteristics of Chemical Deicers during the Winter 1970–1971," Conn. Dept. Transp., Bureau of Highways (Jun., 1971).
"The Chemistry of the Ferrocyanides," Cyanamid's Nitrogen Chemicals Digest, vol. 7, p. 33 (1953) no month available.

*Primary Examiner*—Paul Lieberman
*Assistant Examiner*—Necholus Ogden
*Attorney, Agent, or Firm*—Fitch, Even, Tabin & Flannery

[57] ABSTRACT

The invention relates to a deicing composition and a method of treating a deicing composition containing a water soluble ferrocyanide or ferricyanide salt, such as yellow prussiate of soda, where the resulting product displays a resistance to photodecomposition and the release of cyanide. The deicing composition comprises NaCl, a ferrocyanide or ferricyanide salt and a base.

11 Claims, No Drawings

DEICING COMPOSITIONS CONTAINING FERROCYANIDE ANTICAKING AGENTS

FIELD OF THE INVENTION

The invention relates to a deicing composition comprising sodium chloride, a water soluble ferrocyanide or ferricyanide salt such me sodium or potassium ferrocyanide and ferricyanide, and a base, where the resulting deicing composition displays a resistance to photodecomposition and release of cyanide gas.

BACKGROUND OF THE INVENTION

Calcium chloride and alkali metal salts such as sodium chloride are used extensively in large quantities on roads for snow and ice removal. The problem with using salt as a deicing composition is that salt is liable to clump or cake during periods of extremely low temperatures or during temperature and humidity fluctuations. The caking causes difficulties in dispensing the salt evenly on the roads.

In order to avoid caking or hardening, preservatives or anticaking agents have been added to the deicing compositions. The water soluble ferrocyanide salts, such as sodium and potassium ferrocyanide, $Na_4Fe(CN)_6 \cdot x\ H_2O$ (also commonly called yellow prussiate of soda or "YPS") and $K_4Fe(CN)_6 \cdot x\ H_2O$, where $x=0$ to 10, are common and highly effective anticaking agents. Water soluble ferricyanide salts can also be used as effective anticaking agents. Sodium ferricyanide has the formula: $Na_3Fe(CN)_6 \cdot y\ H_2O$ and potassium ferricyanide has the formula: $K_3Fe(CN)_6 \cdot y\ H_2O$ wherein $y=0$ or 1. Even though these alkali metal ferrocyanides and ferricyanides work very well as anticaking agents in deicing photodecomposition of the ferrocyanide to cyanide in the deicing composition.

The photodecomposition of the deicing compositions containing a cyanide such as a ferrocyanide composition is of particular concern, especially among road crews in the Northeastern United States. See "Rock Salt Cyanide Stirs Road Crew Health Concerns" *The Journal of Commerce* Dec. 28, 1989. The problem is that the deicing composition is typically stored in bulk (large piles) outdoors. When the composition is exposed to sunlight and moisture, it may decompose, thereby releasing cyanide, which can be highly toxic. There is concern among the transportation workers who handle deicing compositions because they may have a harmful atmosphere around them by virtue of cyanide being released from the anticaking component of the composition.

Thus, it is highly desirable to have a deicing composition that possesses anticaking properties, or is spreadable, yet does not photodecompose or release cyanide into the environment when exposed to sunlight.

SUMMARY OF THE INVENTION

The invention is a deicing composition for deicing roads and other surfaces, which composition is resistant to caking and photodecomposition. The composition comprises NaCl, at least about 35 ppm of a water soluble ferrocyanide or ferricyanide, preferably at least about 75 ppm of such a cyanide, and not over about 0.2 weight percent of a base. The base is present at least in an amount to provide a pH of not less than about 9 but not more than about 11 of a 5 weight percent aqueous solution of the deicing composition. In an important aspect of the invention, the base is selected from the group consisting of NaOH, $CaCO_3$, KOH, $MgCO_3$, $K_2CO_3$, CaO, $Ca(OH)_2$, MgO, $Mg(OH)_2$, $Na_2CO_3$ and the like. The use of NaOH and CaO or $Ca(OH)_2$ are especially important aspects of the invention. The invention also relates to a method of preventing the production of cyanide from deicing compositions when exposed to sunlight.

Another aspect of the invention provides a method of reducing by at least 50 percent the rate at which cyanide ($CN^-$) is released into the environment by deicing compositions containing at least about 35 ppm of a water soluble ferrocyanide or ferricyanide salt, such as sodium or potassium ferrocyanide, or sodium or potassium ferricyanide, when the composition is exposed to about 20 hours of sunlight. The method comprises mixing NaCl, the water soluble ferrocyanide or ferricyanide and base to provide the composition of the invention, which composition will release cyanide at a rate which is at least about 50 percent less than a composition containing just NaCl and the anticaking cyanide salt.

The invention clearly is of benefit to those transportation workers who must handle deicing compositions. Another benefit is that the deicing compositions still contain the very valuable anticaking agents which provide for even distribution of deicing compositions on roadways, thereby making them safe for travel during the winter season.

DETAILED DESCRIPTION

The invention is a deicing composition for deicing the road surfaces and other surfaces and a method for reducing the rate of release of cyanide from that composition by at least 50 percent. The deicing composition comprises NaCl, at least about 35 ppm, preferably at least 75 ppm, water soluble ferrocyanide or ferricyanide salt as a NaCl anticaking agent and a base selected from the group consisting of NaOH, $CaCO_3$, $MgCO_3$, $K_2CO_3$, KOH, CaO, $Ca(OH)_2$, MgO, $Mg(OH)_2$, $Na_2CO_3$. The base in the composition of the invention is present at least in an amount to provide a pH of not less than about 9, but not more than about 11, of a 5 weight percent aqueous solution of the deicing composition. In an important aspect of the invention, the water soluble ferricyanide is sodium or potassium ferricyanide and the water soluble ferrocyanide is sodium or potassium ferrocyanide. As used herein in connection with a ferrocyanide or ferricyanide salt, water soluble means a water solubility at 25° C. of at least about 0.005 grams/liter. As used herein, sodium ferrocyanide means $Na_4Fe(CN)_6 \cdot x\ H_2O$, wherein $x=1$ to 10, but is commonly 10, and potassium ferrocyanide means $K_4Fe(CN)_6 \cdot x\ H_2O$, where $x=0$ to 10, but is commonly 3. Potassium ferricyanide means $K_3Fe(CN)_6$ and sodium ferricyanide means $Na_3Fe(CN)_6 \cdot y\ H_2O$ wherein y is 0 or 1. Sodium ferrocyanide also is known as yellow prussiate of soda and potassium ferrocyanide also is known as yellow prussiate of potash. In an important aspect of the invention, the deicing composition comprises from about 35 to about 250 ppm, and preferably from about 75 to about 125 ppm of a water soluble cyanide salt selected from the group consisting of sodium ferrocyanide, sodium ferricyanide, potassium ferrocyanide and potassium ferricyanide and mixtures thereof. While not intending to be bound by any theory, it is believed that the ferrocyanide or ferricyanide salt in the deicing composition must be water soluble for that cyanide salt to have a sufficient anticaking function for the deicing salt in the deicing composition.

In an important aspect, the deicing composition comprises at least about 95 weight percent NaCl, between about 35 to about 250 ppm, preferably between about 75 to about 125 ppm, water soluble ferrocyanide or ferricyanide salt, and not over about 0.2 weight percent base to provide the pH as aforesaid with the percentages being based on the weight of the deicing composition. The base is selected from the group as aforesaid; and while there is sufficient base in the deicing composition to provide a pH of about 9 to about 11 as previously stated, preferably the pH of the 5 weight percent aqueous solution is in the range of from about 10.6 to about 11. In a important embodiment of the invention, the deicing composition comprises sodium or potassium ferrocyanide or ferricyanide and about 2000 ppm lime (CaO), where lime is used as the base, or from about 750 to about 1000 ppm NaOH, where NaOH is used as the base. Preferably the NaCl particles pass through a sieve where the sieve size is as follows: ¾ in. (19.0 mm)—100 weight percent passes through; ½ in. (12.5 mm)—100 weight percent passes through; ⅜ in. (9.5 mm)—about 95 to 100 weight percent passes through; No. 4 (4.75 mm)—about 20 to about 100 weight percent passes through; No. 8 (2.36 mm)—about 10 to about 60 weight percent passes through; and No. 30 (600 μm)—between 0 and about 15 weight percent passes through the sieve in accordance with the ASTM test D632. It is known that the larger particles are less likely to cake. Therefore, a particle distribution having a higher percentage of larger particle size can be more desirable from a caking standpoint. However, the composition is not limited to the ranges described above, any size particle range can be used.

The composition is prepared by combining the ingredients and mixing them thoroughly. The order of mixing is not critical, but it is preferred to first blend the ferrocyanide or ferricyanide salt and the base. The blend is then added to the NaCl. The ferrocyanide or ferricyanide salt can be added to the NaCl or may be added as a brine solution, but the amount of water incorporated in the salt is preferably less than about 1 percent, more preferably less than about 0.5 percent by weight of the deicing composition. Sodium hydroxide may be added as a solution, such as a 10 weight percent solution of NaOH, which solution is premixed with the ferrocyanide or ferricyanide prior to mixing the NaOH and ferrocyanide or ferricyanide with the NaCl. Where the base is lime, the lime may be added to the NaCl in dry form and dry mixed with the salt.

According to the method of the invention, the rate of release of cyanide into the environment from deicing compositions containing the ferrocyanide or ferricyanide salt according to the invention is reduced by at least 50 percent, as compared to a deicing composition which does not contain a base according to the invention, after exposure to sunlight for about 20 hours. About 12 ppm/hr cyanide ($CN^-$) is released from deicing composition comprising 80 ppm of YPS. This rate of release of $CN^-$ is reduced by at least 50 percent by blending the NaCl with a base and ferrocyanide or ferricyanide as described herein after an exposure to ultraviolet light for about 20 hours. This rate of reduction of at least 50 percent is achieved by using concentrations of base such as $Na_2CO_3$ as low as 100 ppm or lime at concentrations at about 2000 ppm.

EXAMPLES

Example 1

Preparation of Deicing Salt

Coarse rock salt, medium rock salt were mixed in fines. The mixture was analyzed to be within accordance with ASTM D632.

| U.S.S. Sieve | Particle Size Inches | Analysis |
|---|---|---|
| ⅜ | = 0.375 | ·2% |
| 4 mesh | = 0.187 | 22% |
| 8 mesh | = 0.0937 | 35% |
| 30 mesh | = 0.0232 | 37% |
| pan | | 4% |
| | | 100% |

Example 2

Preparation of the Deicing Salt Treated with Alkaline Agent 0.0840 g of sodium ferrocyanide ($Na_4Fe(CN)_6 \cdot 10 H_2O$) and 2.1 g of $Na_2CO_3$ are dissolved into 10.5 grams of water. The latter solution is then added to the salt of Example 1 and is mixed thoroughly. The salt mixture contains about 80 ppm sodium ferrocyanide, about 2000 ppm $Na_2CO_3$ and about 1% moisture was placed in a 5 gal. plastic pail and the procedures with the apparatus in Example 3 are followed.

Example 3

Part 1

An ultra violet (UV) light chamber is devised to cause the photodecomposition of ferrocyanide decahydrate, hereafter Control 1, and to trap the released hydrogen cyanide gas. The UV chamber consists of a plastic 5 gal. pail with an air inlet and an outlet. The salt without treatment with an alkaline agent is prepared by dissolving 0.0840 g of sodium ferrocyanide in 10.5 g of water. The salt of Example 1, 1050 g, is added to the water mixture and thoroughly blended to completely wet the salt. The salt contains about 80 ppm ferrocyanide. The wet salt is placed in the bottom of a plastic 5 gal. container, with a surface area of 0.69 square feet. The salt completely covers the bottom surface of the pail. The pail is tightly sealed.

The sealed salt sample is exposed to UV light (short wave) of 254 nm and the resulting cyanide gas is collected in a 1% sodium hydroxide solution (200 g). Moist air is continuously passed through the sealed pail and is bubbled into a 1% sodium hydroxide solution, which traps the hydrogen cyanide gas. The evaporation of the sodium hydroxide solution is monitored and water is added as needed. The Control is monitored for 192 hours. The amount of cyanide gas in the sodium hydroxide solution trap is measured with a HACH Cyanide Test Kit, Model CYN-3, which can be purchased by HACH Company, P.O. Box 389, Loveland, Colo. 80539. A sodium hydroxide sample is carefully neutralized with a diluted solution of sulfuric acid. The sodium hydroxide is analyzed for cyanide gas.

As stated previously, the rate of photodecomposition of the Control is monitored periodically for 192 hours, see Table I below. Using the above procedure, the rate of photodecomposition was observed to increase after 2.5 hours and after 22 hours began to decrease. The rate of photodecomposition leveled off at 192 hours.

TABLE I

Control
Photodecomposition of sodium ferrocyanide and NaCl
80 ppm sodium ferrocyanide, 1% $H_2O$

| Time (hours) | $CN^-$ Level (ppm) | Rate (ppm $CN^-$/hour) |
|---|---|---|
| 2.5 | 0.057 | 0.023 |
| 6 | 0.28 | 0.047 |
| 22 | 1.28 | 0.058 |
| 72 | 1.35 | 0.018 |
| 96 | 1.45 | 0.015 |
| 192 | 1.59 | 0.008 |

Based on the equilibrium equation, the theoretical amount of $CN^-$ would be 22.6 ppm. The decomposition rate appears to be quite slow.

Part 2

The ferrocyanide salt is treated with an alkaline agent. The alkaline agent is either sodium carbonate, lime or sodium hydroxide at different concentrations. The salt blend of Example 1 is 1050 grams. The alkaline agent is combined with 10.5 grams of water. The water mixture is added to the salt and thoroughly blended to completely wet the salt. The samples are monitored for about 24 hours. Control II is prepared by blending 1050 grams of salt from Example 1 with a water mixture containing 0.0840 grams of sodium ferrocyanide and 10.5 grams of water. Control II is monitored for about 22 hours. The results are presented in Table II below.

TABLE II

| Treatment | Time (hours) | % Reduction of Control Decomposition Rate | $CN^-$ ppm | pH |
|---|---|---|---|---|
| Control II (No Treatment) | 22 | 0 | 1.28 | 6.4 |
| 100 ppm $Na_2CO_3$ | 18 | 52.3 | 0.50 | 9.0 |
| 500 ppm $Na_2CO_3$ | 17.5 | 60.7 | 0.40 | 9.6 |
| 1000 ppm $Na_2CO_3$ | 15 | 63.4 | 0.32 | 9.9 |
| 750 ppm NaOH | 24 | 97.9 | 0.03 | 10.3 |
| 1000 ppm NaOH | 24 | 98.6 | 0.02 | 10.6 |
| 2000 ppm CaO | 24 | 97.1 | 0.04 | 11.1 |

As can be seen from Table II, the alkaline treatment was very effective at reducing the rate of photodecomposition. Also, as can be seen in Table II, any of the alkaline agents substantially reduce the amount of cyanide gas released by photodecomposition.

Example 4

Evaluation of anticaking properties of deicing salt treated with alkaline agent

The following samples are prepared with a high grade salt of 0.0232–0.0083 inch particle size and are evaluated: Control III, a high grade salt with 1% moisture; a high grade salt with 1% moisture and 80 ppm sodium ferrocyanide; Examples of the invention—high grade salt with 1% moisture, 80 ppm sodium ferrocyanide having been treated with 1000 ppm of sodium hydroxide, and a high grade salt with 1% moisture, 80 ppm sodium ferrocyanide having been treated with 2000 ppm calcium oxide.

In order to determine the anticaking effects of the treated sodium ferrocyanide, the sample 100 g is placed in a 100 ml plastic beaker and dried in an oven at 110° C. for 16 hours. The sample is sized by 4 passing through a 20 mesh sieve and the percentage caking is recorded.

TABLE III*

| Treatment | % un-caked | % un-caked | % un-caked | Averaged % un-caked | Averaged % caked |
|---|---|---|---|---|---|
| 1% $H_2O$, Control III | 8.7 | 9.8 | 9.1 | 9.2 | 90.8 |
| 80 ppm sodium ferrocyanide | 69.2 | 62.1 | 70.2 | 67.2 | 32.8 |
| 80 ppm sodium ferrocyanide 1000 ppm NaOH | 49.2 | 55.9 | 54.5 | 53.2 | 46.8 |
| 80 ppm sodium ferrocyanide 2000 ppm CaO | 76.7 | 91.6 | 91.2 | 86.5 | 13.5 |

*As can be seen from Table III, the modified sodium ferrocyanide has acceptable anticaking properties.

What is claimed is:

1. A deicing composition comprising at least about 95 weight percent sodium chloride, a base selected from the group consisting of NaOH, KOH, CaO, Ca(OH)$_2$, MgO, Mg(OH)$_2$, Na$_2$CO$_3$, K$_2$CO$_3$, CaCO$_3$, MgCO$_3$ and mixtures thereof, at least about 35 ppm of a water soluble cyanide salt selected form the group consisting of a ferrocyanide salt and a ferricyanide salt, the composition comprising the base in an amount of at least about 100 ppm and for providing a 5 weight percent water solution of the deicing composition with a pH in the range of from about 9 to about 11.

2. The composition of claim 1, wherein the water soluble cyanide salt is selected from the group consisting of sodium ferrocyanide, potassium ferrocyanide, sodium ferricyanide, potassium ferricyanide and mixtures thereof.

3. The composition of claim 1, wherein the base is selected from the group consisting of NaOH, CaO and Ca(OH)$_2$.

4. The composition of claim 1 wherein the water soluble cyanide salt is selected from the group consisting of K$_3$Fe(CN)$_6$·y H$_2$O, K$_4$Fe(CN)$_6$·x H$_2$O, Na$_3$Fe(CN)$_6$·y H$_2$O, Na$_4$Fe(CN)$_6$·x H$_2$O and mixtures thereof wherein x=0 to 10 and y=0 or 1.

5. The composition of claim 4, wherein the cyanide salt is sodium ferrocyanide or potassium ferrocyanide and the deicing composition comprises from about 75 to about 125 ppm cyanide salt.

6. The composition of claim 11, wherein the base is NaOH and the NaOH comprises from about 750 to about 1000 ppm of the composition.

7. The composition of claim 11, wherein the base is CaO and the CaO comprises from about 50 to about 2000 ppm of the composition.

8. A method of reducing the rate of cyanide being released from a deicing composition containing NaCl and at least about 35 ppm of a water soluble cyanide salt selected form the group consisting of a ferrocyanide salt and ferricyanide salt, wherein the deicing composition is exposed to sunlight, the method comprising blending sodium chloride, at least 35 ppm of the cyanide salt and a base selected from the group consisting of NaOH, KOH, CaO, Ca(OH)$_2$, MgO, Mg(OH)$_2$, Na$_2$CO$_3$, K$_2$CO$_3$, MgCO$_3$, CaCO$_3$ and mixtures thereof, where the base is in an amount of at least about 100 ppm and for providing a 5 weight percent water solution of the deicing composition with a pH in the range of from about 9 to about 11.

9. The method of claim 8, wherein the water soluble cyanide salt is selected from the group consisting of sodium ferrocyanide, potassium ferrocyanide, sodium ferricyanide, potassium ferricyanide and mixtures thereof and wherein the deicing composition comprises from about 35 to about 250 ppm water soluble cyanide salt.

10. The method of claim 9 wherein the deicing composition comprises at least about 95 weight percent NaCl and comprises from about 75 to about 125 ppm water soluble cyanide salt.

11. The composition of claims 1 or 3, wherein the amount of base in the deicing composition is such that the pH of a 5 weight percent water solution of the deicing composition is between about 10.6 and 11.

* * * * *

UNITED STATES PATENT AND TRADEMARK OFFICE
CERTIFICATE OF CORRECTION

PATENT NO. : 5,376,292
DATED : December 27, 1994
INVENTOR(S) : Lucas

It is certified that error appears in the above-indentified patent and that said Letters Patent is hereby corrected as shown below:

Column 6, line 42, change "claim 4" to --claims 1 or 2--.

Signed and Sealed this

Thirtieth Day of May, 1995

Attest:

BRUCE LEHMAN

Attesting Officer      Commissioner of Patents and Trademarks